J. Obernesser,
Permutation Lock.
No. 115,231. Patented May 23, 1871.

Attest
Inventor
Jacob Obernesser

United States Patent Office.

JACOB OBERNESSER, OF CINCINNATI, OHIO, ASSIGNOR TO CHARLES DIEBOLD AND JACOB KIENZLE, OF SAME PLACE.

Letters Patent No. 115,231, dated May 23, 1871.

IMPROVEMENT IN PERMUTATION-LOCKS.

The Schedule referred to in these Letters Patent and making part of the same.

I, JACOB OBERNESSER, of Cincinnati, in the county of Hamilton and State of Ohio, have invented certain Improvements in Permutation-Locks, of which the following is a specification.

The object of my invention is an improved mode of suspending the dog without supporting it on the combination-wheels.

As is now generally well known, any construction of a permutation-lock wherein the dog rests on the periphery of the combination-wheels until the combination is formed which permits the dog to enter the notches in said wheels is faulty, for the reason that such construction and arrangement serve to facilitate the picking of the lock, as, by the employment of a micrometer the relative position of the combination-wheels may be determined.

This defect has invoked the inventive powers of mechanics and others for its removal, and a number of ingenious devices has been invented designed to accomplish this purpose.

Experience has shown that my invention removes this defect, and by a device that is simple, durable, and inexpensive.

Description of the Accompanying Drawing.

General Description.

Figure 1:
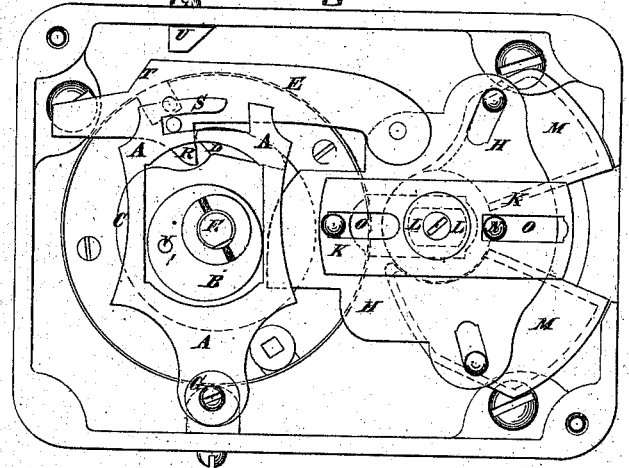
Figure 1 is an elevation of a permutation-lock embodying my invention, with the back plate of the casing removed, and showing the relative position of the different parts of the lock when open.
Figure 2:
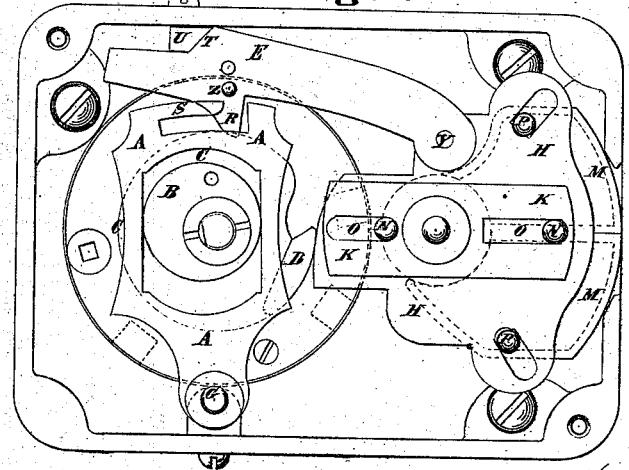
Figure 2 is a similar elevation, but shows the relative position of the parts when shut.

A is a yoke, of the form clearly shown in the drawing, figs. 1 and 2, and pivoted to a stump at G.

The yoke A embraces the circular disk B, as shown in the drawing.

Figure 3:
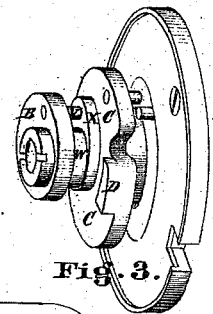
Figure 3 represents a portion of the works of the lock detached.

The disk B is attached eccentrically to the spindle or arbor F, and has a pin, V, passing through the washer X and into the disk C, (as shown in fig. 3,) and which serves to retain the disks B and C in the same relative position on the arbor, the disk C being attached to the arbor in the usual manner.

Back of the disk B there is placed the washer or nut W, screwed on the arbor, which serves to keep the washer X in place, and is made of such thickness as to separate the disks B and C so as to permit the dog-lever to drop in behind the yoke A.

D is a projecting fly or lug cast on the face of the disk C, as shown in the drawing.

E is the dog-lever, pivoted to the plate H at Y.

H is a plate having pins N N and a large slot near its center, and through which the stump L passes. This slot is shown by dotted lines in fig. 1.

K is a plate securely attached to the stump L, and having slots O O, through which the pins N N work as the plate H is drawn backward or pushed forward.

M M are the jaws or bolts, and are separately sleeved on the stump L.

These jaws have pins P P, working in slots, as shown in the drawing.

R is a hook on the dog-lever.

U is a stop attached to the lock-case, and against which the shoulder T of the dog-lever rests when raised out of the notches of the combination-wheels.

The combination-wheels may be of any usual construction.

From the foregoing description of specific parts the operation of this lock will be readily understood.

When the combination is set and the wheels are brought to the proper relative position the dog drops into the notches, the dog-lever passes down behind the yoke A, and the pin or fly Z on the lever passes below the tongue S. The arbor being still gently turned to the right, the lug D engages the hook R and draws the dog-lever back, and with it the plate H, which opens the jaws M, and the lock is now open.

The lock being open, to lock it turn the arbor to the left; the lug D now pushes the plate H forward, and the jaws are closed; and still turning to the left, the incline on the disk C engages the back of the hook R, and at the proper time raises the dog-lever to its elevated position, and the pin or fly Z passes above and rests upon the tongue S, and thus holds the lever in its elevated position without permitting the dog to rest on the combination-wheels except for the moment of time that the fly Z passes beyond the point of the tongue S.

Claims.

I claim as my invention—

1. The combination of the yoke A, constructed with slot and tongue S, and the lever E, provided with a fly or pin, Z, substantially as and for the purpose set forth.

2. The combination of the yoke A, constructed with slot and tongue S, the lever E, provided with pin Z, eccentric wheel B, and disk C, having lug D thereon, substantially as and for the purpose set forth.

JACOB OBERNESSER.

Witnesses:
S. S. MORRIS,
J. C. HINTZ. Jr.